No. 847,521. PATENTED MAR. 19, 1907.
W. A. STEBBINS & H. BERGSTROM.
TURN DOWN COLLAR FOLDER AND SHAPER.
APPLICATION FILED MAR. 14, 1904.
3 SHEETS—SHEET 1.
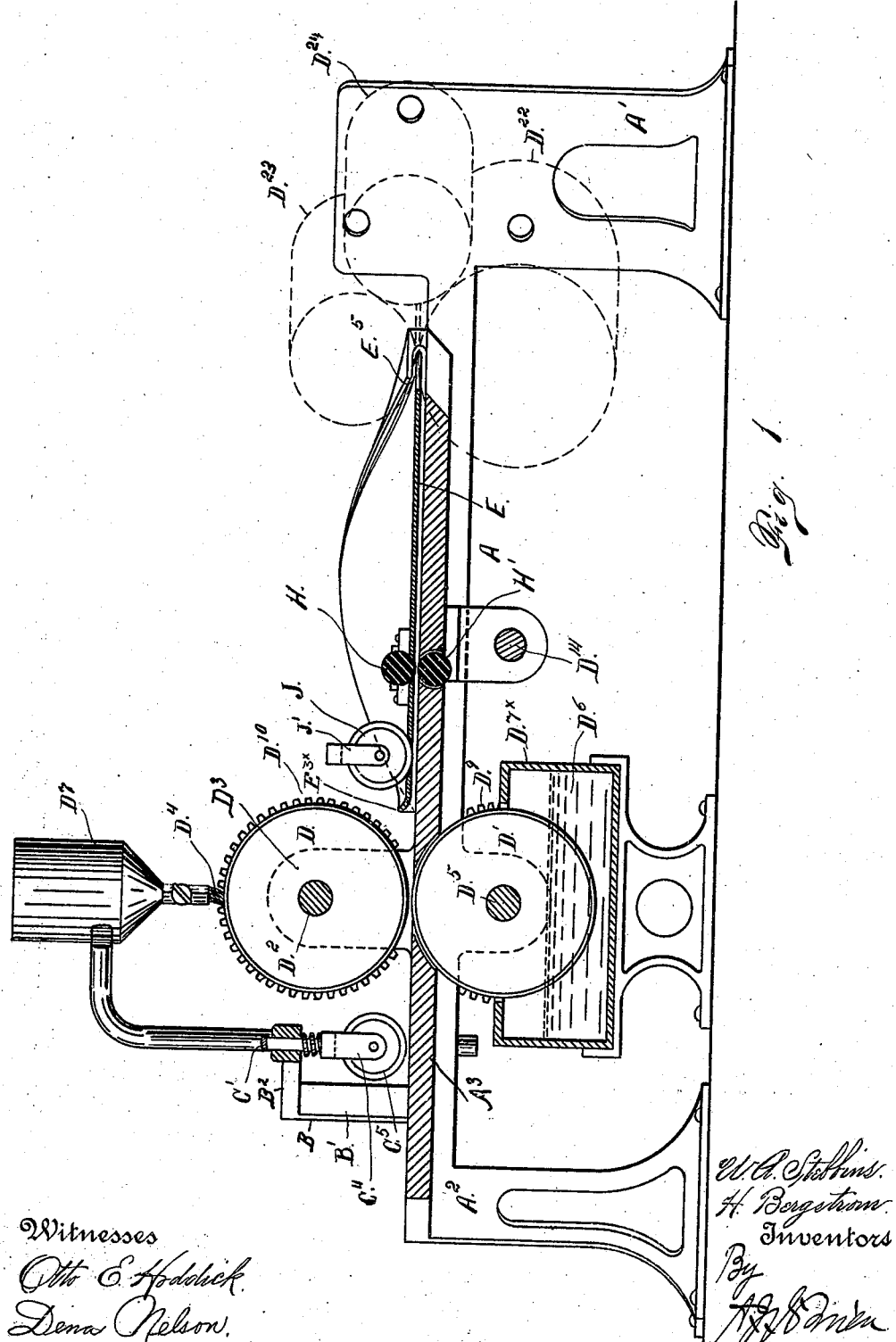

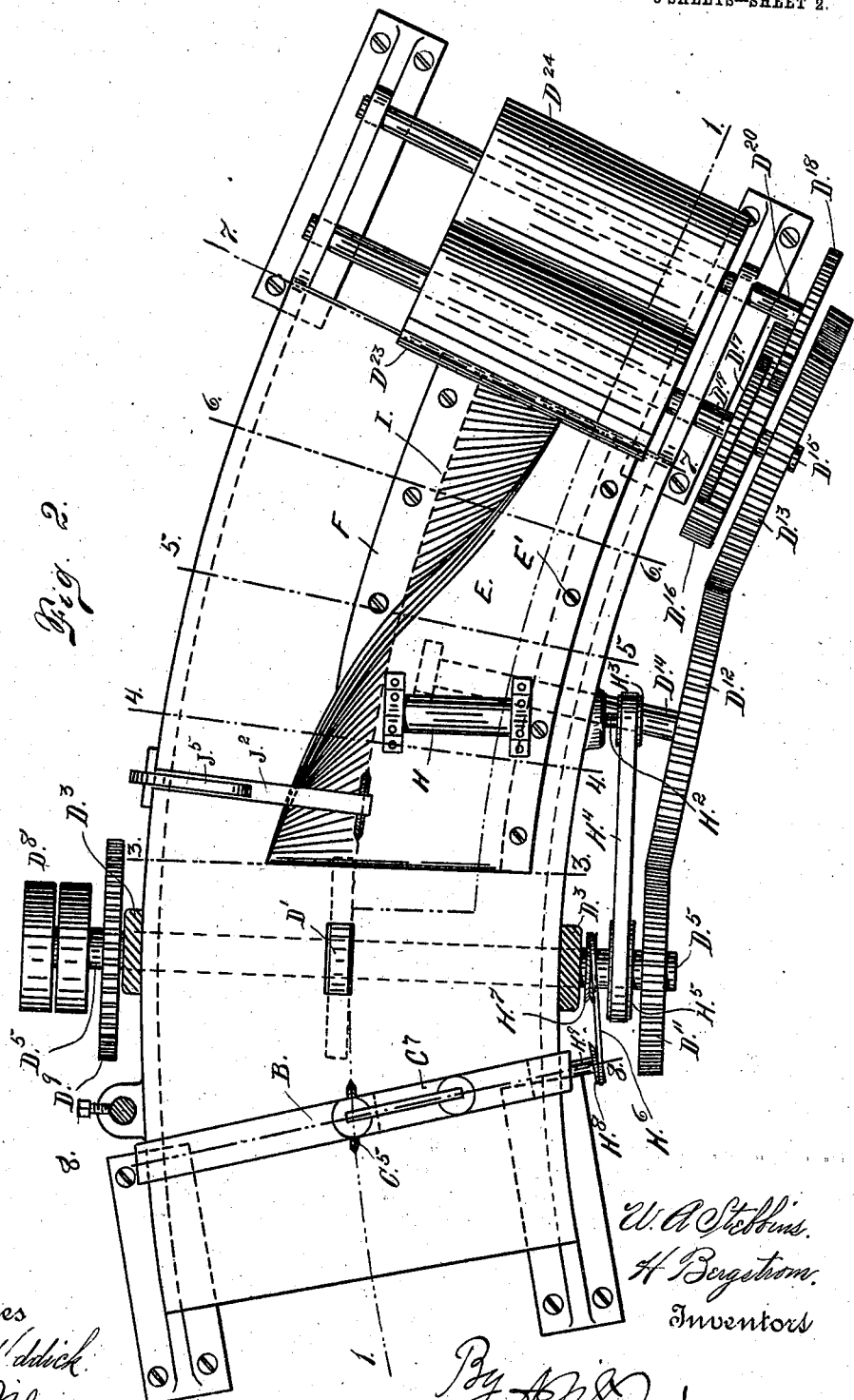

No. 847,521. PATENTED MAR. 19, 1907.
W. A. STEBBINS & H. BERGSTROM.
TURN DOWN COLLAR FOLDER AND SHAPER.
APPLICATION FILED MAR. 14, 1904.
3 SHEETS—SHEET 3.
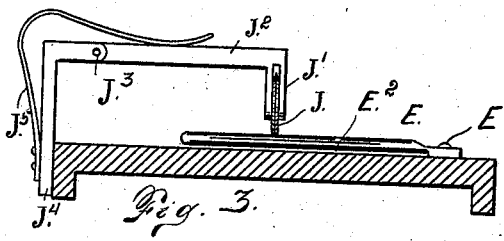
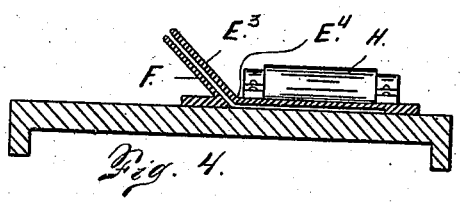
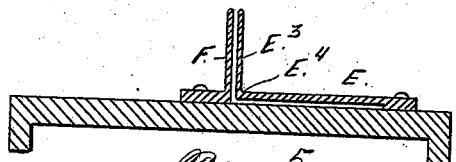
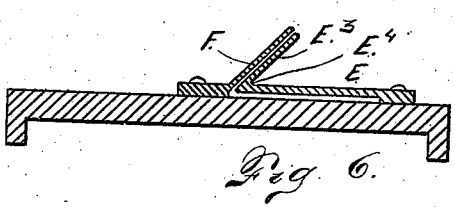
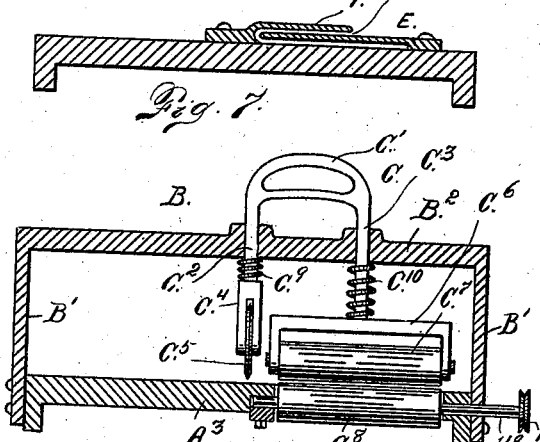
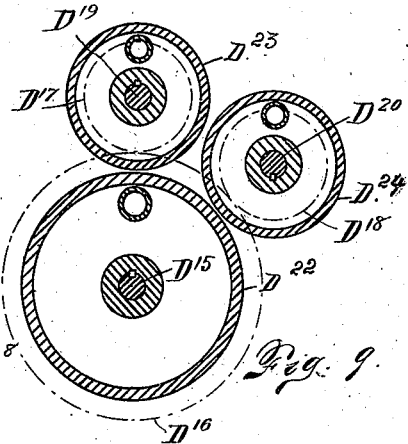
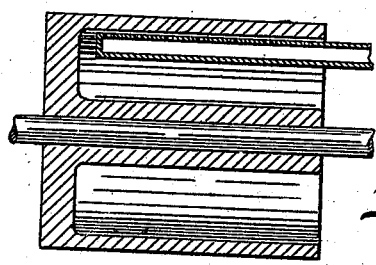
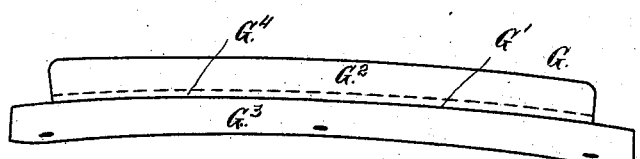
Witnesses
Otto E. Hoddick
Dena Nelson
Inventors
W. A. Stebbins
H. Bergstrom
By their Attorney
THE NORRIS PETERS CO., WASHINGTON, D.C.

UNITED STATES PATENT OFFICE.

WALTER A. STEBBINS AND HILMER BERGSTROM, OF DENVER, COLORADO, ASSIGNORS TO THE AMERICAN SPECIALTY COMPANY, OF DENVER, COLORADO.

TURN-DOWN-COLLAR FOLDER AND SHAPER.

No. 847,521.  Specification of Letters Patent.  Patented March 19, 1907.

Application filed March 14, 1904. Serial No. 198,136.

*To all whom it may concern:*

Be it known that we, WALTER A. STEBBINS, a citizen of the United States of America, and HILMER BERGSTROM, a subject of the King of Sweden, both residing at the city and county of Denver and State of Colorado, have invented certain new and useful improvements in Turn-Down-Collar Folders and Shapers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in turn-down-collar folders and shapers, our object being to provide a machine adapted to automatically and quickly fold a turn-down collar and afterward impart to it the proper shape.

Our further object is to provide an apparatus of this class which shall be comparatively simple in construction, economical in cost, reliable, durable, and efficient in use; and to these ends the invention consists of the features, arrangements, and combinations hereinafter described and claimed, all of which will be fully understood by reference to the accompanying drawing, in which is illustrated an embodiment thereof.

In this drawing, Figure 1 is a vertical longitudinal section of the machine, taken on the line 1 1, Fig. 2. Fig. 2 is a top or plan view of the machine, parts being shown in section and the upper dampening-wheel and one of the gears removed. Figs. 3, 4, 5, 6, 7, and 8 are sections taken on the lines 3 3, 4 4, 5 5, 6 6, 7 7, and 8 8, respectively, of Fig. 2. Fig. 9 is a transverse section taken through the shaping-rollers. In this view the position of the gears of the shaping-rollers is indicated by dotted lines. Fig. 10 is a longitudinal section taken through one of the said rollers. Fig. 11 is a plan view of a collar of the description which our improved machine is adapted to fold and shape. Fig. 12 is a transverse section of the collar.

The same reference characters indicate the same parts in all the views.

Let A designate a suitable table provided with supporting-legs A' and A², which, as shown in the drawing, are made fast to a suitable stationary support by means of fastening devices. The top of the table, as shown in plan view in Fig. 2 of the drawing, is preferably curved horizontally to conform to the general curvature of the collar to be folded. Mounted on the forward or left-hand extremity of the table, referring to Figs. 1 and 2 of the drawing, is a frame B, composed of upright parts B' and a transverse part B². Slidably mounted in the transverse part B² is a part C, consisting of a handhold upper part C' and two vertical legs C² and C³. The lower extremity of the leg C² is connected with a holder C⁴ for a small wheel C⁵, whose periphery is preferably beveled on both sides or V-shaped in cross-section. The lower extremity of the arm C³ of the part C is connected with a holder C⁶ for a roller C⁷, coöperating with a roller C⁸, the latter being journaled in the top A³ of the table  Between the wheel-holder C⁴ and the under surface of the transverse part B² is located a coil-spring C⁹, which normally has a tendency to hold the wheel C⁵ at its lowest limit of movement. Also between the roller-holder C⁶ and the under surface of the part B² is located a coil-spring C¹⁰, which surrounds the arm C³. Attention is called to the fact that a slot is cut in the top of the table where the roller C⁸ is located to permit the latter to protrude slightly above the top of the table in order that it may coöperate with the roller C⁷. The wheel C⁵ is a guide-wheel, and the rollers C⁷ and C⁸ have their axes extending at an angle to the axis of the wheel C⁵, whereby as a collar is passing over the table when the machine is performing its function the tendency of the rollers is to feed the collar in a direction extending at an angle to the horizontal curvature of the table's top. When the device is acting on a collar, the guide-roller C⁵ engages the collar at the seam or folding-line on the inside.

Slightly in the rear of the guide-roller C⁵ are located the two dampening-rollers D and D'. The roller D is mounted on a shaft D², journaled in suitable upright parts D³, connected with the opposite sides of the table. The periphery of this wheel is preferably faced with rubber or other suitable soft material. Mounted above the wheel D is a receptacle D⁷, containing water and having a wick or fibrous piece of material D⁴, one extremity of which is in communication with the water of the receptacle, while the other extremity engages the periphery of the wheel as the latter rotates, whereby the face of the wheel is kept damp or moist sufficiently for the purpose hereinafter explained. The wheel D is so arranged that the lowest part of its periphery is very close to the plane of the upper surface of the table, whereby it coöperates with the uppermost part of the periphery of the wheel D', which projects upwardly through an opening formed in the table, the highest part of the periphery of the wheel D' projecting slightly above or occupying a position on a level with the upper surface of the table. The wheel D' is made fast to a transverse shaft $D^5$, extending underneath the table. This wheel D' rotates in a quantity of water $D^6$, placed in a tank or receptacle $D^{7\times}$, suitably supported underneath the table. The shaft $D^5$, which extends underneath the table as aforesaid, is provided at one extremity with fast and loose pulleys $D^8$, whereby the shaft may be operated from any suitable motor or source of power. Also mounted on the shaft $D^5$ on the side of the table adjacent the pulleys $D^8$ is a gear $D^9$, which meshes with a gear $D^{10}$, fast on the shaft $D^2$, whereby the last-named shaft is operated. On the extremity of the shaft $D^5$ remote from the pulleys $D^8$ is located another gear $D^{11}$, which meshes with a gear $D^{12}$, the latter meshing with a gear $D^{13}$. The gear $D^{12}$ is mounted on a shaft $D^{14}$, journaled in the table, while the gear $D^{13}$ is fast on a shaft $D^{15}$, journaled in the leg A' of the table. To this shaft $D^{15}$ is made fast a gear $D^{16}$, which meshes with two gears $D^{17}$ and $D^{18}$, made fast to shafts $D^{19}$ and $D^{20}$, respectively. The shafts $D^{15}$, $D^{19}$, and $D^{20}$ are provided with shaping-rollers $D^{22}$, $D^{23}$, and $D^{24}$, respectively, located at the rear extremity of the table.

Between the shaping-rollers and the dampening or moistening rollers a plate E is secured to the upper surface of the table by suitable fastening devices E'. Beyond the fastening edge of this plate the latter is cut away underneath, leaving a space $E^2$ between the lower surface of the plate and the top of the table. The forward extremity of this plate is bent upwardly slightly, as shown at $E^{3\times}$, forming a sort of mouth to receive the collar as it leaves the dampening rolls or wheels. The forward extremity of this plate occupies a position parallel with the top of the table; but immediately in the rear of the forward extremity of the plate the latter is bent upwardly from the table, as shown at $E^3$ in Fig. 4, the edge $E^4$ of the bend being in line with the seam or folding-line G' of the collar G. This part $E^3$ is gradually bent upwardly, diminishing its interior angle as the rear extremity of the folding-plate is approached until finally the part $E^3$ is doubled over upon the upper surface of the body of the plate and merges thereinto, as shown at $E^5$ in Fig. 1. For instance, where the section indicated by the line 5 5 is taken the part $E^3$ is at right angles to the body E of the plate. (See Fig. 5.) Where the section indicated by the line 6 6 is taken, the part $E^3$ of the plate forms the oblique angle indicated in Fig. 6, while where the section indicated by the line 7 7 is taken the plate $E^3$ is merged into the body E of the plate or removed entirely since the flat or horizontal part of the plate takes its place and the angular part $E^3$ is no longer needed.

At the point where the part $E^3$ of the plate E begins to bend upwardly a coöperating correspondingly bent or inclined plate F is secured to the table just outside or to the left of the part $E^3$, (see Fig. 4,) a sufficient space being left between the parts $E^3$ and F to allow the part $G^2$ of the collar to pass between them. As the rear extremity of the table is approached the plate F is bent to keep pace or correspond with the bend of the plate $E^3$, whereby as the collar is fed along the top of the table the part $G^3$ passes between the body of the plate E and the top of the table, and the part $G^2$ is gradually bent over upon the part $G^3$ through the instrumentality of the parts F and $E^3$, as indicated in Figs. 3 to 7, inclusive, of the drawing. It will be seen that where the section indicated by the line 7 7 is taken, while the plate part $E^3$ is done away with, the part F occupies a horizontal position parallel to the body of the plate E and slightly raised above the same, leaving a space for the part $G^2$ of the collar to pass between the plate E and the part F. Hence it will be seen that after the collar is fed over the top of the table and acted on by the plate parts E, $E^3$, and F, shaped as described and illustrated, the part $G^2$, which when the operation commenced lay in the same plane with the part $G^3$, will be folded down upon the part $G^3$, as is required. After leaving the folding-plates or coöperating folding-plate parts the collar passes first between the rollers $D^{22}$ and $D^{24}$ and afterward between the rollers $D^{22}$ and $D^{23}$, whereby the collar is shaped or caused to curl or bend as is required for use.

In rear of the moistening wheels or rollers D and D' and located above the plate E is a roller H, whose lowest portion passes through a slot formed in the body of the plate E, whereby the lowest part of the roller coöperates with the uppermost part of a coöperating roller H', journaled in an opening formed in the top of the table, and whose uppermost portion lies in the same plane or projects slightly above the plane of the upper surface of the table, whereby the two rollers H and H' coöperate to act upon the part $G^3$ of the collar during the travel of the latter through the folding-plates heretofore described. The axis of these rollers H and H' extend slightly at an angle to the horizontally-curved path of the collar, this path being indicated by the broken line I on Fig. 2 of the drawing, whereby there is a tendency on the part of the rollers H and H' to cause the collar to travel at an angle to its real path, whereby the seam G' of the collar is made to follow the line of the angle E⁴ or the line of the bend between the horizontal part and the part E³ of the folding-plate E as the collar travels along over the table. The dampening-wheels are so arranged that a narrow space G⁴ on the part G² of the collar adjacent the seam or folding-line G' is moistened in order to facilitate the folding operation after the collar leaves the moistening wheels or rollers. Between the rollers H and H' and the moistening-wheels is a small wheel J, mounted in a depending part J' of an arm J², hinged at J³ to a stationary part J⁴, made fast to one edge of the table, being the edge remote from the fastening devices E' of the folding-plate E. The periphery of this wheel J is beveled on both sides, forming a V-shaped edge adapted to engage the collar on the folding-line G' as the latter is acted on by the folding devices. The lowest part of the periphery of this wheel J passes through a narrow slot formed in the body of the plate E on the line of the angle E⁴, and consequently on the folding-line G' of the collar. This wheel forms a guide to cause the collar to travel in the circular path over the top of the table, as heretofore explained, and its axis lies at an angle to the axis of the feed-rollers H and H'. The arm J² is acted on by a leaf-spring J⁵, whereby the wheel is held under suitable tension to properly perform its function.

The lower roller H' is connected with a shaft H², provided at one extremity with a pulley H³, connected with a belt H⁴, which engages a larger pulley H⁵, fast on the operating-shaft D⁵, whereby the necessary rotary movement is imparted to the roller H'. Attention is called to the fact that a belt H⁶ connects a pulley H⁷, fast on the shaft D⁵, with a small pulley H⁸, fast on the spindle H⁹ of the roller C⁸, whereby the necessary rotary movement is transmitted to the latter.

From the foregoing description the use and operation of our improved machine will be readily understood. At the beginning of the folding operation a collar of the construction shown in Fig. 11 is first passed between the rollers C⁷ and C⁸, the roller C⁷, together with the guide-wheel C⁵, being first lifted slightly upwardly in order to place one extremity of the collar in position. Then, assuming that the machine is in operation, by virtue of the construction and connections heretofore explained the collar is fed rearwardly on the table, the guide-wheel C⁵ engaging the seam or folding-line G' of the collar and being so located as to cause the latter to travel in an arc of large radius, as indicated by the broken line I on Fig. 2 of the drawing. As any portion of the collar leaves the rollers C⁷ and C⁸ and the guide-wheel C⁵ it passes between the dampening-wheels D and D', whereby a narrow space G⁴, adjacent the folding-line G' is dampened. The collar then passes, by virtue of the feeding movement imparted by the rollers C⁷ and C⁸ and the moistening-wheels, to the plates E and F, whereby through the instrumentality of the guide-wheel J and the feed-rollers H and H', together with the peculiar shape of the plates E and F and the plate part E³, the part G² of the collar is folded over and pressed downwardly upon the part G³, as heretofore explained, after which the collar is passed between the shaping-rollers D²², D²³, and D²⁴, as already explained.

Having thus described our invention, what we claim is—

1. In a folder for turn-down collars, the combination with a table, of a plate secured to the table and having its body portion raised a short distance therefrom to receive a turn-down collar, a portion of the plate beginning at its forward extremity being turned upwardly and over upon itself, the change in the position of the bent portion of the plate being gradual from its forward extremity to its rear extremity, the said bent part being discontinued or merging into its horizontal part at its rear extremity, another plate cooperating with the bent portion of the first-named plate, a space being left between the second plate and the bent plate part to receive the portion of the collar to be folded, and suitable means for causing the collar to travel through the said folding devices.

2. The combination with a table, of a plate secured thereto and having its body portion slightly raised from the table leaving the thickness of a collar beneath, the forward extremity of the said plate being parallel with the table, and a portion of the said plate extending from the forward extremity rearwardly, being bent upwardly from the table and gradually over upon the horizontal portion of the plate, the said bent portion being discontinued at the rear extremity of the plate, a plate part located adjacent the bent portion of the first-named plate and occupying a position parallel therewith whereby as the collar is fed through the folding-plates, the folding portion thereof passes between the bent portion of the first-named plate and the second plate, the rear extremity of the second plate occupying a position parallel with the horizontal portion of the first-named plate whereby the collar as it is fed through the plates is folded as described, suitable means for feeding the collar through the folding devices, and suitable means for guiding the collar during its travel across the table during the performance of the folding function.

3. The combination with a table, of moistening wheels or rollers whose contact parts or parts which approach nearest each other are approximately in the plane of the upper surface of the table, means for applying moisture to the peripheries of the said wheels, a folding-plate mounted upon the table and having a shallow space between the said plate and the table, the forward extremity of the plate being parallel with the upper surface of the table, and a portion of the plate beyond its forward extremity extending to its rear extremity being bent upwardly and over toward itself until the rear extremity of the plate is reached where the said bent portion is discontinued, and a second plate coöperating with the bent portion of the folding-plate, substantially as described.

4. In a turn-down-collar folder, the combination with a table, of a roller journaled at the forward extremity of the table, a spring-held vertically-movable roller mounted above the table and coöperating with the first-named roller, a guide-wheel located at the inner extremity of the said rollers, moistening-wheels located in the rear of the said rollers and guide-wheel, and folding devices located in the rear of the moistening-rollers, substantially as described.

5. In a turn-down-collar folder, the combination with a table, of feed-rollers mounted at the head or forward extremity of the table, a guide-wheel located adjacent the feed-rollers and having its axis extending at an angle to the said rollers, moistening devices located in the rear of the said rollers and guide-wheel, coöperating folding-plates located in the rear of the moistening-wheels, and suitable means coöperating with the plates for feeding and guiding the collar therethrough, substantially as described.

6. In a turn-down-collar folder, the combination with feed-rollers mounted at the head of the table, moistening-wheels located in the rear of the feed-rollers, folding-plates located in the rear of the moistening-wheels, a pair of feed-rollers acting on the collar as it passes through the folding-plates, and a guide-wheel located between the last-named feed-rollers and the moistening-wheels.

7. In a turn-down-collar folder, the combination with suitable folding devices mounted on the table, feed-rollers mounted at the head of the table forward of the folding devices, moistening-rollers located between the feed-rollers and the forward extremity of the folding devices, a guide-roller located forward of the moistening-rollers, a second guide-roller located in the rear of the moistening-rollers and engaging the collar while the latter is passing through the folding devices, and a second pair of feed-rollers located in the rear of the last-named guide-roller and acting on the collar as it passes through the folding devices, the axis of both pairs of feed-rollers occupying positions at an angle to the axes of the guide-rollers, substantially as described.

8. In a turn-down-collar folder, the combination with a table, folding-plates mounted on the table, one of the plates having a shallow space between it and the upper surface of the table and having a portion turned upwardly and over upon itself and extending from its forward to its rear extremity, the said bent part constantly changing position from the front to the rear of the table and being discontinued at the rear extremity of the table, and a coöperating plate occupying a position parallel with the bent part of the first-named plate, a collar-space being left between the bent part of the first-named plate and the said coöperating plate, substantially as described.

9. In a turn-down-collar folder, the combination of feed-rollers mounted at the head of the table, a guide-wheel also mounted at the head of the table and engaging the collar from above, the axis of the guide-wheel forming an angle with the axes of the feed-rollers, moistening-wheels located in the rear of the said guide-wheel and adapted to engage the portion of the collar to be folded, folding-plates located in the rear of the moistening-wheels, and shaping-rollers located in the rear of the folding-plates, substantially as described.

In testimony whereof we affix our signatures in presence of two witnesses.

WALTER A. STEBBINS.
HILMER BERGSTROM.

Witnesses:
DENA NELSON,
A. J. O'BRIEN.